(12) United States Patent
Hagerman (10) Patent No.: US 9,460,109 B1
(45) Date of Patent: Oct. 4, 2016

(54) CENTRALIZED PROVISIONING PROCESS LEVERAGING NETWORK ATTACHED STORAGE

(71) Applicant: Sprint Communications Company L.P., Overland Park, KS (US)

(72) Inventor: Phillip Hagerman, Grandview, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 367 days.

(21) Appl. No.: 14/242,294

(22) Filed: Apr. 1, 2014

(51) Int. Cl.
*G06F 17/30* (2006.01)

(52) U.S. Cl.
CPC .................................. *G06F 17/302* (2013.01)

(58) Field of Classification Search
None
See application file for complete search history.

(56) References Cited

U.S. PATENT DOCUMENTS

| | | | |
|---|---|---|---|
| 7,454,487 B1* | 11/2008 | Becher | H04L 67/1097 707/999.2 |
| 9,274,811 B1* | 3/2016 | Reeves | G06F 9/445 |
| 9,319,286 B2* | 4/2016 | Panuganty | H04L 41/0893 |
| 2003/0167456 A1* | 9/2003 | Sabharwal | G06F 8/24 717/108 |
| 2010/0325624 A1* | 12/2010 | Bartolo | G06F 8/61 717/176 |
| 2012/0158806 A1* | 6/2012 | Snyder | H04L 67/1097 707/827 |
| 2013/0086585 A1* | 4/2013 | Huang | G06F 9/5072 718/1 |
| 2013/0263209 A1* | 10/2013 | Panuganty | H04L 43/04 726/1 |
| 2013/0326510 A1* | 12/2013 | Adekile | G06F 11/0709 718/1 |

OTHER PUBLICATIONS

Gite, Linux: Set Environment Variable, Apr. 14, 2011, pp. 1-18.*
Configuring WebSphere Application Server (running IBM InfoSphere Information Server) for nonroot administration, 2011, pp. 1-3.*
Hoffman, Auto Scaling Your Website With Amazon Web Services (AWS)—Part 2, May 25, 2012, pp. 1-11.*

* cited by examiner

*Primary Examiner* — Albert Phillips, III (57) ABSTRACT

A method of building application server instances. The method comprises configuring, by a script, a first application server instance with parameter definitions exported from an environment properties file, wherein an environment properties file comprises common parameter definitions for a plurality of different application server instances under the same environment. The method further comprises configuring, by the script, the first application server instance with parameter definitions exported from a first instance properties file, wherein an instance properties file comprises parameter definitions specific to an individual application. The method further comprises building the first application server instance on a build server, wherein the build server is a central server, storing the first application server instance on a network attached storage (NAS) file system, mounting files of the first application server instance by a first target computer from the NAS system, and running the first application server instance on the first target computer.

20 Claims, 5 Drawing Sheets

CENTRALIZED PROVISIONING PROCESS LEVERAGING NETWORK ATTACHED STORAGE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Internet is becoming increasingly prevalent in our daily lives with the rapid development and popularization of portable network capable devices. Additionally, more and more electronic devices that did not have network capabilities are getting network capable. With the development of the Internet, network attached storage (NAS) servers are becoming more and more accessible. Network attached storage servers are computer devices that can be attached to a network to store files and make them available to accredited users. A network attached storage server may have its own internet protocol addresses.

SUMMARY

In an embodiment, a method of building application server instances is disclosed. The method comprises configuring, by a script, a first application server instance with parameter definitions exported from an environment properties file, wherein an environment properties file comprises common parameter definitions for a plurality of different application server instances under the same environment. The method further comprises configuring, by the script, the first application server instance with parameter definitions exported from a first instance properties file, wherein an instance properties file comprises parameter definitions specific to an individual application. The method further comprises building the first application server instance on a build server, wherein the build server is a central server, and storing the first application server instance on a network attached storage (NAS) file system. The method further comprises mounting files of the first application server instance by a first target computer from the NAS file system and running the first application server instance on the first target computer. The method further comprises configuring, by the script, a second application server instance with parameter definitions exported from the environment properties file and configuring, by the script, the second application server instance with parameter definitions exported from a second instance properties file. The method further comprises building the second application server instance on the build server, storing the second application server instance on the NAS file system, mounting files of the second application server instance by a second target computer from the NAS file system, and running the second application server instance on the second target computer.

In an embodiment, a computer server is disclosed. The computer server comprises a memory, a processor, and a plurality of environment properties files stored in the memory, each environment properties file comprising common parameter definitions for a plurality of different application server instances under the same environment. The computer server further comprises a plurality of instance properties files stored in the memory, wherein each instance properties file comprises parameter definitions specific to an individual application. The computer server further comprises a script stored in the memory of the computer server, when executed by the processor of the computer server, exports parameter definitions from one of the environment properties files based on input credentials, exports parameter definitions from one of the instance properties files based on the input credentials, and configures an application server instance with the exported parameter definitions. The script further builds the application server instance, and configures the application server instance with at least one custom configuration function, wherein a custom configuration function definition is utilized for adding parameters definitions specific to an application server instance.

In an embodiment, a method of building an application server instance is disclosed. The method comprises configuring, by a script, the application server instance with parameter definitions exported from an environment properties file based on input credentials, wherein an environment properties file comprises common parameter definitions for a plurality of different application server instances under the same environment. The method further comprises configuring, by the script, the application server instance with parameter definitions exported from an instance properties file based on the input credentials, wherein an instance properties file comprises parameter definitions specific to an individual application server instance for an application. The method further comprises configuring the application server instance with at least one custom configuration function, wherein a custom configuration function is utilized for adding parameters specific to an application server instance. The method further comprises building the application server instance on a build server, wherein the build server is a central server, storing the application server instance on a network attached storage (NAS) file system, and shutting the application server instance down. The method further comprises mounting files of the application server instance by a target computer from the NAS file system and running the application server instance on the target computer.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may occur when building application server instances based on manually composed property files, particularly when large numbers of application servers are being built. In a large enterprise, for example in a major mobile communication service provider, hundreds of application servers may be built from property files to support various stages of application development and test. An application server builder system is described herein that performs application server builds based on two different types of properties files: an environment properties file and an instance properties file. Generally, the environment properties file contains parameter definitions that can be used in building multiple application servers, thereby reducing the number of times those parameters have to be manually composed. This may reduce the numbers of errors as well as reduce the level of effort expended by technicians to build the application servers. The Instance properties files may contain definitions of parameters that may have different values from application server to application server.

A plurality of environment properties files and a plurality of instance properties files may be stored on the central server computer for various application server instances. A script may be composed and utilized to manage the workflow for building application server instances. For example, the script may comprise command line interface commands (CLICs). The command line interface commands may be called during execution of the script to build and configure an application server instance. The script may first start an application server template during the process of building an application server instance, for example an application server template stored in a memory of the central server. Parameters may be added to the application server template to build the application server instance, for example from an environment properties file and/or an instance properties file. Existing parameters in the application server template may be defined during the build process. The script may request credentials from a user, for example a server administrator of the central server. The script may then locate a corresponding environment properties file and a corresponding instance properties file from the pool of environment properties files and the pool of instance properties files respectively based on input credentials.

The script may export parameter definitions from the environment properties file and configure the application server instance with the exported parameter definitions. The script may then export parameter definitions from the instance properties file and configure the application server instance with the exported parameter definitions. Parameter (s) of the application server instance that have been defined with parameter definition(s) exported from the environment properties file may be redefined by parameter definition(s) exported from the instance properties file. For example, parameter(s) that have been given value(s) based on parameter definition(s) exported from the environment properties file may be overridden with value(s) based on parameter definition(s) exported from the instance properties file.

An environment custom configuration function definition may be included at the end of the environment properties file. An instance custom configuration function definition may likewise be included at the end of the instance properties file. The environment/instance configuration function definition may comprise no parameter definitions. Rarer parameters may be added to either of the custom configuration function definitions, or both, by the server administrator prior to the build process of the application server instance. A custom configuration function definition with parameter definitions may be referred to as a custom configuration function herein. For example, the environment custom configuration function definition with parameter definitions may be referred to as an environment custom configuration function, and the instance custom configuration function definition with parameter definitions may be referred to as an instance custom configuration function. As part of the configuration process with the environment properties file and the instance properties file, the application server instance may be configured with parameter definitions from either of the environment custom configuration function and the instance custom configuration function, or both. That may conclude the build process of the application server instance. After the application server instance is built and configured and the build process is over, the application server instance may be further configured with a final configuration file. For example, the final configuration file may change the ownership of the application server instance, move the application server instance to a different directory, or conduct another type of final configuration.

An administrator script may be used for administrative functions for the application server instance during and/or after the build process of the application server instance. For example, the administrator script may start the application server instance, stop the application server instance, collect diagnostic information for the application server instance, or conduct another type of administrative function. After the application server instance is built and configured with the final configuration file if applicable, the built application server instance may be shut down and stored on a network attached storage (NAS) file system. When a target computer desires to execute the application server instance for an application, the target computer may mount relevant files of the application server instance to the target computer and execute the application server instance.

It is beneficial to divide parameters into two groups and put them into two types of properties files, an environment properties file and an instance properties file, and use the build process taught in the present disclosure for building and configuring an application server instance. Some of the build process is automated so that some time may be saved or some error may be avoided. For example, time may be saved that would otherwise be spent in manually inputting parameter definitions into one properties file each time before an application server instance is built. Additionally, errors that occur when parameter definitions are input manually into a properties file each time before an application server instance is built may be avoided or limited. Said in other words, building a plurality of applications servers using a single environment properties file and multiple instance properties files promotes obtaining the benefits of reuse—less labor hours and reduced opportunities for human errors—while supporting the differences that generally militate against reuse.

Figure 1:
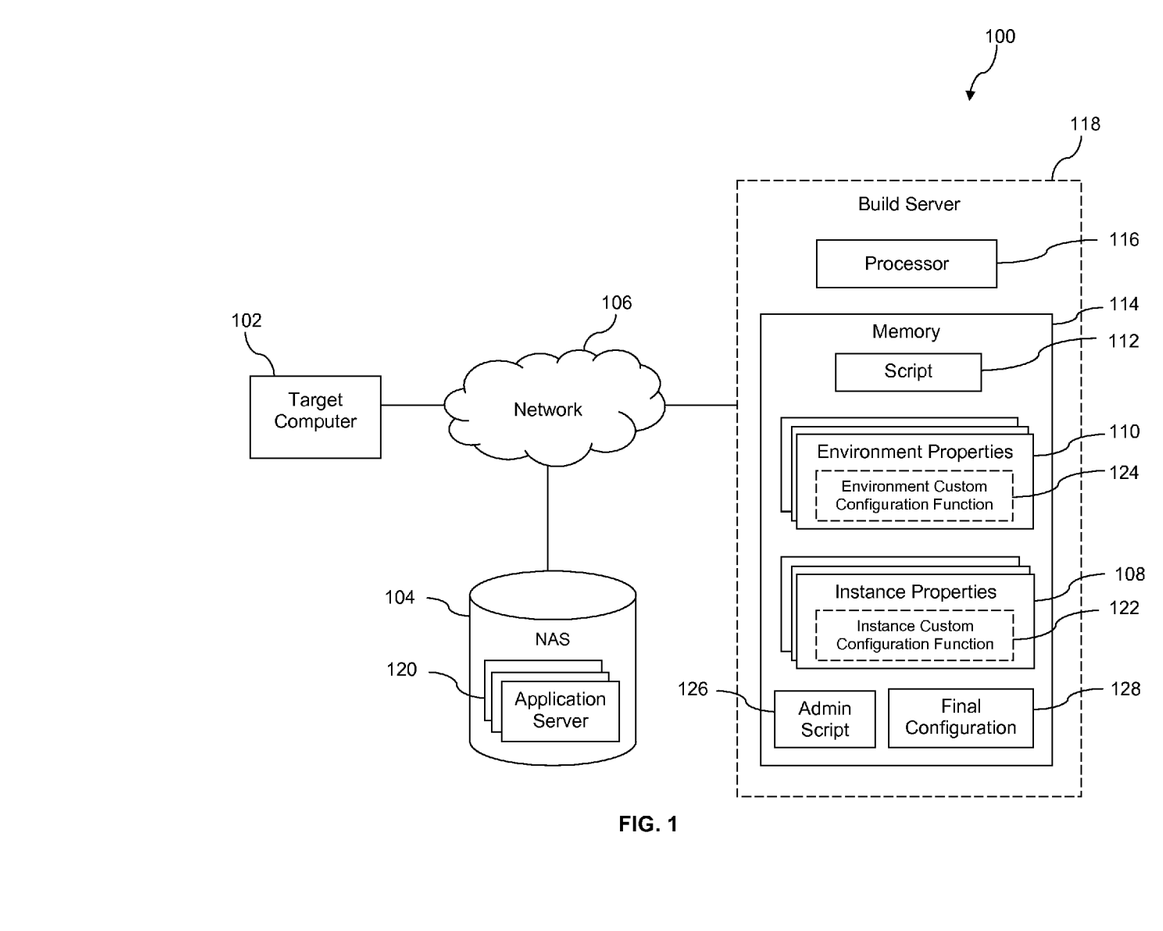
FIG. 1 is an illustration of a communication system according to an embodiment of the disclosure.

Turning now to FIG. 1, a communication system 100 is described. In an embodiment, the communication system 100 comprises a plurality of target computers 102, a plurality of network attached storage (NAS) servers 104, and a build server 118. The build server 118 may comprise a processor 116 and a memory 114. The memory 114 may comprise a script 112, a plurality of environment properties files 110, and a plurality of instance properties files 108. The NAS 104 may comprise a plurality of application server instances 120. The build server 118 may have access to a network 106. The target computer 102 and the NAS 104 may also have access to the network 106. The network 106 may comprise any combination of private and public networks.

It is understood that the system 100 may comprise any number of target computers 102, any number of NAS servers 104, and any number of build servers 118. The target computer 102, the NAS server 104, and the build server 118 may be any of a desktop computer, a server computer, or another network capable device. The NAS server 104 may be a computer device that can be attached to a network to store files and make them available to accredited users. The NAS servers 104 may have their own internet protocol addresses. The communication system 100 may comprise more than one NAS servers 104. The NAS servers 104 may locate at distinct physical locations. The NAS server(s) 104 may form a NAS file system.

The application server instance 120 may be an execution environment for an application. For example, application code may be written and deployed into an application server instance 120. The application server instance 120 may promote efficient execution of procedures (e.g. programs, routines, scripts) for supporting application(s) that run in the application server instance 120. For example, the application server instance 120 may provide a container model for application(s). The application server instance 120 may provide application(s) with services such as clustering, failover, load-balancing, data source connection handling, or another type of service. The application server instance 120 may be built and/or configured before the application may run in the application server instance 120. The application server instance 120 configuration may be part of the build process. In an embodiment, the application may be written in Java programming language. The application server 120 may be a Java application server such as a JBoss application server (e.g. a JBoss EAP6 version application server).

After the application server instance 120 is built and/or configured, the application server instance 120 may be stored in the NAS 104. The NAS server(s) 104 may be said to form a NAS file system. Thus, the built and/or configured application server instance 120 may be said to be stored in the NAS file system. The application server instance 120 may run on the target computer 102 where one or more Java applications may run in the application server instance 120. For example, the target computer 102 may mount associated files of the application server instance 120 from the NAS file system and run the application server instance 120 when the Java application is run by a processor of the target computer 102.

The build server 118 may be a central server, for example maintained by a communications service provider. The communications service provider may have more than one central server at various physical locations, and a central server that is physically closer to a target computer 102 may be chosen to build an application server instance 120 for the target computer 102. In an embodiment, a repository of various versions of JBoss and/or various types of middleware may be stored in the memory 114 of the build server 118. The repository may be a version control system for files. Environment properties file(s) 110 and instance properties file(s) 108 may be stored in the memory 114 of the build server 118. When credential(s) of an administrator or an application server instance 120 is entered, a proper environment properties file 110 and/or a proper instance properties file 108 may be selected to build the corresponding application server instance 120.

The script 112 stored in the memory 114 of the build server 118 may build and/or configure application server instances 120 with the selected environment properties file 110 and the selected instance properties file 108. The script 112 may start an application server template stored in the memory 114 and build an application server instance 120 by adding parameters to the application server template and/or editing exiting parameter definitions, for example by overriding parameter definitions of the application server template. After an application server instance 120 is built and/or configured, the application server instance 120 may be shut down. The application server instance 120 may then be stored in the NAS file system. Files associated with the application server instance 120 may be mounted by the target computer 102 and the application server instance 120 may be run by the target computer 102 at the time of execution of an application that runs in the application server instance 120.

An environment properties file 110 may be a properties file that comprises common configurable parameters or parameter definitions for application server instances 120 under the same environment. A parameter definition may comprise a pair of strings, one storing the name of the parameter, and the other storing the value. A parameter definition may be stored in a variety of formats, for example "parameter name=value", "parameter name=value", "parameter name: value", or another type of format. More complex configuration formats such as extensible markup language (XML) or yet another multicolumn layout (YAML) may also be utilized to store parameter definitions.

In current systems, parameters may be manually input, for example by a server administrator, into a properties file when an application server instance is to be built and/or configured. The process may be time consuming and error prone. However, when properties are divided to be defined in an environment properties file 110 and/or an instance properties file 108, time that currently is used to manually input parameters may be saved and manual input error may be limited. Parameters that are defined in an environment properties file 110 or an instance properties file 108 by predefined rule(s) may be called standard parameters. An environment properties file 110 may be used to build a plurality of distinct application server instances 120 under the same environment. Non-standard parameters may be later added into a custom configuration function definition 122/124 before the build process of an application server instance 120.

For example, a parameter may be determined whether or not to be a standard parameter based on the percentage of how many application server instances 120 may be configured with it. For example, a parameter may be determined whether or not to be a standard parameter based on an 80-20 rule, a 70-30 rule, a 90-10 rule, or another rule. For example, with the 80-20 rule, parameters that are common to 80% of application server instances 120 may be defined in an environment properties file 110 and/or an instance properties file 108. It should be noted a parameter is different from a parameter definition. A parameter may be the name of the parameter while a parameter definition may comprise the name of the parameter and the value of the parameter. Parameters may be further divided based on the parameter definitions to decide which parameter definitions may be defined in an environment properties file 110 and which parameter definitions may be defined in an instance properties file 108.

Types of environments may include a development environment, a system test environment, a test environment, a break fix environment, a training environment, a production environment, or another type of environment. For example, a development environment may be associated with application server instances for developing applications and a test environment may be associated with application server instances for testing applications. One type of environment may include more than one environment. Environments of the same type may be marked with different numbers to differentiate from each other. Each environment of the same type with a different number may be associated with a different release cycle. For example, develop environments 0-6 may be seven different development environments. Development environment 0 may be associated with the first release of a year and development environment 1 may be associated with the second release of the year.

An environment properties file 110 may comprise a variety of parameters common to a plurality of application server instances 120 under the same environment, for example application identification, an application environment, directory of the build server 118, JBoss version, Java development kit (JDK) version, JBoss vault usage information, logging level information, standard heap size, standard Java options, secure socket layer (SSL) usage information, clustering information, active directory as login mechanism usage information, or another parameter.

The environment properties files 110 may be stored in the memory 114 of the build server 118. A plurality of environment properties files 110 may be stored in the memory 114, each corresponding to an environment. The parameter definitions in the environment properties file 110 may be exported by the script 112 during a process of building a corresponding application server instance 120. The application server instance 120 may be configured with the parameter definitions exported from the environment properties file 110 by the script 112.

An instance properties file 108 may comprise parameter definitions that are specific to an application while common to application components of that same application. An application may comprise a variety of application components, for example functions, processes, or another type of component. Each application component may run in an individual application server instance 120 and thus an instance properties file 108 may be created to comprise parameter definitions specific to an application while common to application components of that same application.

An instance properties file 108 may comprise a variety of parameters common to application components of the same application, for example identification of the target computer 102, an internet protocol address that the application server instance 120 will listen on, identification of the application server instance 120, wait time for an administrator script 126 at starting the application server instance 120, wait time for the administrator script 126 at stopping the application server instance 120, data source(s) with the connection information, size of the connection pool, or another parameter.

The instance properties files 108 may be stored in the memory 114 of the build server 118. A plurality of instance properties files 108 may be stored in the memory 114, each corresponding to an application. The parameter definitions in the instance properties file 108 may be exported by the script 112 during a process of building a corresponding application server instance 120. The application server instance 120 may be configured with the parameter definitions exported from the instance properties file 108 by the script 112. By configuring the application server instance 120 with parameter definitions from the instance properties file 108, parameter(s) that has already been defined by the environment properties file 110 may be redefined.

The environment properties file 110 may comprise an environment custom configuration function definition 124 at the end of the file. The instance properties file 108 may comprise an instance custom configuration function definition 122 at the end of the file. A custom configuration function definition 122/124 may be a configuration function without parameter definitions. Parameter definitions may be added, for example by an administrator of the build server 118, to the custom configuration function definition 122/124 before the application server instance 120 is built. These parameters may comprise rarer parameters than parameters defined in the environment properties file 110 or the instance properties file 108.

In other words, a custom configuration function definition 122/124 may be utilized to add parameters that are rarer than standard parameters defined in the environment properties file 110 or the instance properties file 108. For example, rarer parameters, for example than standard parameters in the environment properties file 110, that are specific to a specific environment may be added to the environment custom configuration function definition 124. Similarly, rarer parameters, for example than standard parameters in the instance properties file 108, that are specific to an application server instance 120 may be added to the instance custom configuration function definition 122. A custom configuration function definition 122/124 with parameter definitions may be called a custom configuration function, for example an environment custom configuration function 124 or an instance custom configuration function 122.

A final configuration file 128 may be stored in the memory 114 of the build server 118. The final configuration file 128 may be utilized by the script 112 to perform custom configurations after the application server instance 120 is built and/or configured. The final configuration file 128 may be edited, for example by the administrator of the build server 118, before the build process of the application server instance 120. For example, the final configuration file 128 may be utilized to change the ownership of the application server instance 120, to move the application server instance 120 to another directory, or for anther final configuration purpose.

An administrator script 126 may be stored in the memory 114 of the build server 118. The administrative script may conduct administrative functions for each application server instance 120. For example, the administrator script 126 may comprise functions such as starting an application server instance 120, stopping an application server instance 120, collecting diagnostic information, deploying code, adding users to an application server instance 120, adding application specific logs to standard log rotation script, or another function. The administrator script 126 may be a single editable point of entry for administrator(s) of the build server 118, an application support team, and/or personnel from other departments of the communications service provider. Activities of the administrator script 126 may be logged, for example what action the administrator script 126 performed, who performed the action with the administrator script 126, date of the action, time of the action, or other relevant information. A command line interface (CLI) may be utilized, and command line interface commands (CLICs) may be input to execute configuration commands, for example to call scripts for a variety of functionality. The command line interface commands may also be written in the script 112 to execute configuration commands.

The script 112 may be stored in the memory 114 of the build server 118. When executed by the processor 116 of the build server 118, the script 112 may perform a variety of functionality to build and/or configure application server instances 120. For example, after the script is called by the command line interface command(s), the script may request credential(s) from a user (e.g., an administrator of the build server 118). With the credential(s), the script may locate a corresponding environment properties file 110 and a corresponding instance properties file 108. The script 112 may first export parameter definitions from the environment properties file 110 and then export parameter definitions from the instance properties file 108. Parameter definitions defined in the environment custom configuration function 124 and the instance custom configuration function 122 may also be exported by the script 112 as part of the environment properties file 110 and the instance properties file 108 respectively.

The script 112 may build a corresponding application server instance 120. The script may configure the application server instance 120 with the parameter definitions exported from the environment properties file 110 first and then with the parameter definitions exported from the instance properties file 108. After the application sever instance 120 is built and/or configured, the script 112 may perform final configuration with information from the final configuration file 128. The script 112 may shut down the application server instance 120 and save the application server instance 120 on the NAS file system after the application server instance 120 is configured with the final configuration file 128. When the target computer 102 desires to execute the application server instance 120, the target computer 102 may mount relevant files of the application server instance 120 from the NAS 104 file system and execute the application server instance 120. For example, the target computer 102 may copy the relevant files of the application server instance 120 from the NAS 104 file system and execute the application server instance 120 on the target computer 102. Alternatively, the target computer 102 may treat the NAS 104 file system as external storage, mount the relevant files of the application server instance 120 from the NAS 104 file system, and execute the application server instance 120.

Figure 2A:
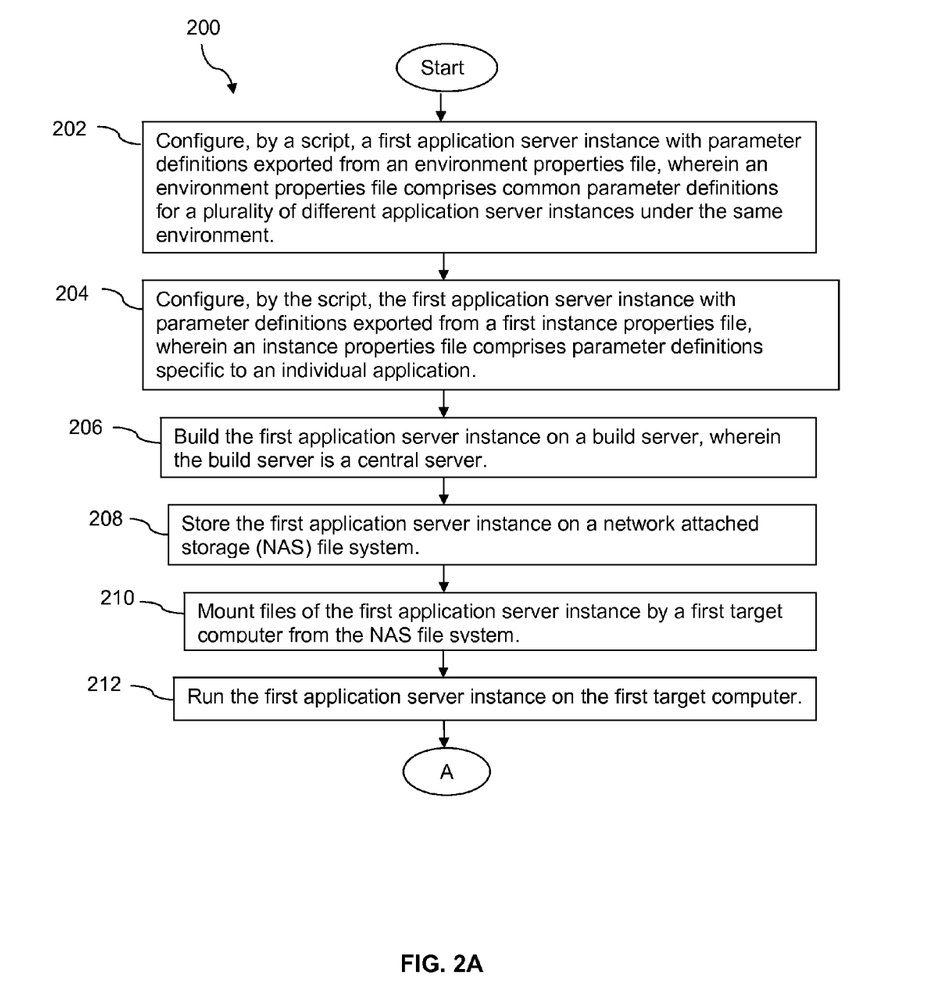
FIG. 2A and FIG. 2B is a flow chart illustrating a method according to an embodiment of the disclosure.
Figure 2B:
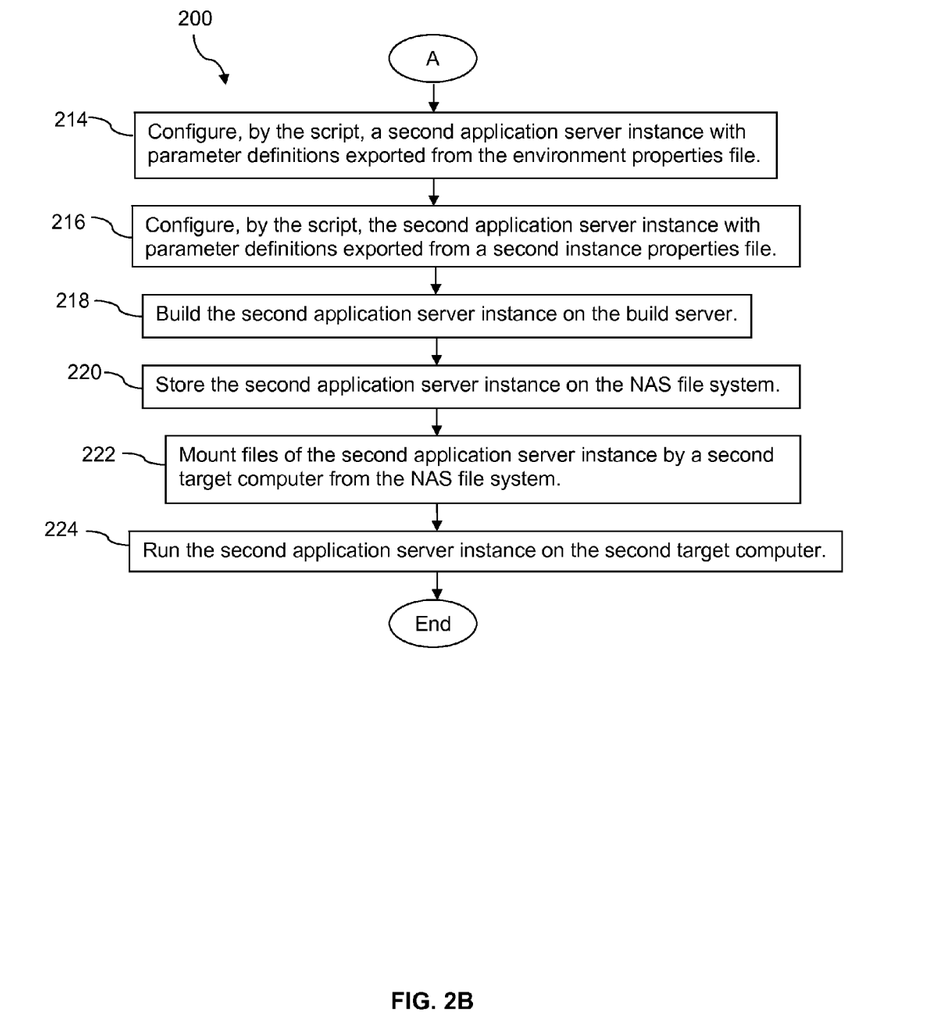

Turning now to FIG. 2A and FIG. 2B, a method 200 is described. At block 202, a first application server instance is configured by a script with parameter definitions exported from an environment properties file, wherein an environment properties file comprises common parameter definitions for a plurality of different application server instances under the same environment. For example, the application server instance 120 may be configured by the script 112 with parameter definitions exported from a corresponding environment properties file 110. The environment properties file 110 may comprise common parameter definitions for a plurality of different application server instances 120 under the same environment.

At block 204, the first application server instance 120 is configured by the script 112 with parameter definitions exported from a first instance properties file 108, wherein an instance properties file 108 comprises parameter definitions specific to an individual application. At block 206, the first application server instance 120 is built on a build server 118, wherein the build server 118 is a central server.

At block 208, the first application server instance 120 is stored on a network attached storage (NAS) 104 file system. At block 210, files of the first application server instance 120 are mounted by a first target computer 102 from the NAS 104 file system. At block 212, the first application server instance 120 is run on the first target computer 102.

At block 214, a second application server instance is configured by the script with parameter definitions exported from the environment properties file. For example, when a second application server instance under the same environment as the first application server instance 120 is to be built, common parameter definitions exported from the same environment properties file 110 may be utilized to configure the second application server instance by the script 112. In an embodiment, when a third application server instance under a different environment from the first application server instance 120 is to be built, parameter definitions exported from a different environment properties file may be utilized to configure the third application server instance by the script 112.

At block 216, the second application server instance is configured by the script 112 with parameter definitions exported from a second instance properties file. For example, when the second application server instance is to run a different application from the application the first application instance 120 is to run, a second instance properties file may be used by the script 112 to configure the second application server instance. Parameter definitions may be exported from the second instance properties file to configure the second application server instance by the script 112.

At block 218, the second application server instance is built on the build server 118. For example, the second application server instance may be built by the script 112 on the build server 118. At block 220, the second application server instance is stored on the NAS 104 file system. At block 222, files of the second application server instance are mounted by a second target computer from the NAS 104 file system. When a second target computer is to run the second application server instance, files of the second application server instance may be mounted by the second target computer from the NAS 104 file system. At block 224, the second application server instance is run on the second target computer 102.

Figure 3:
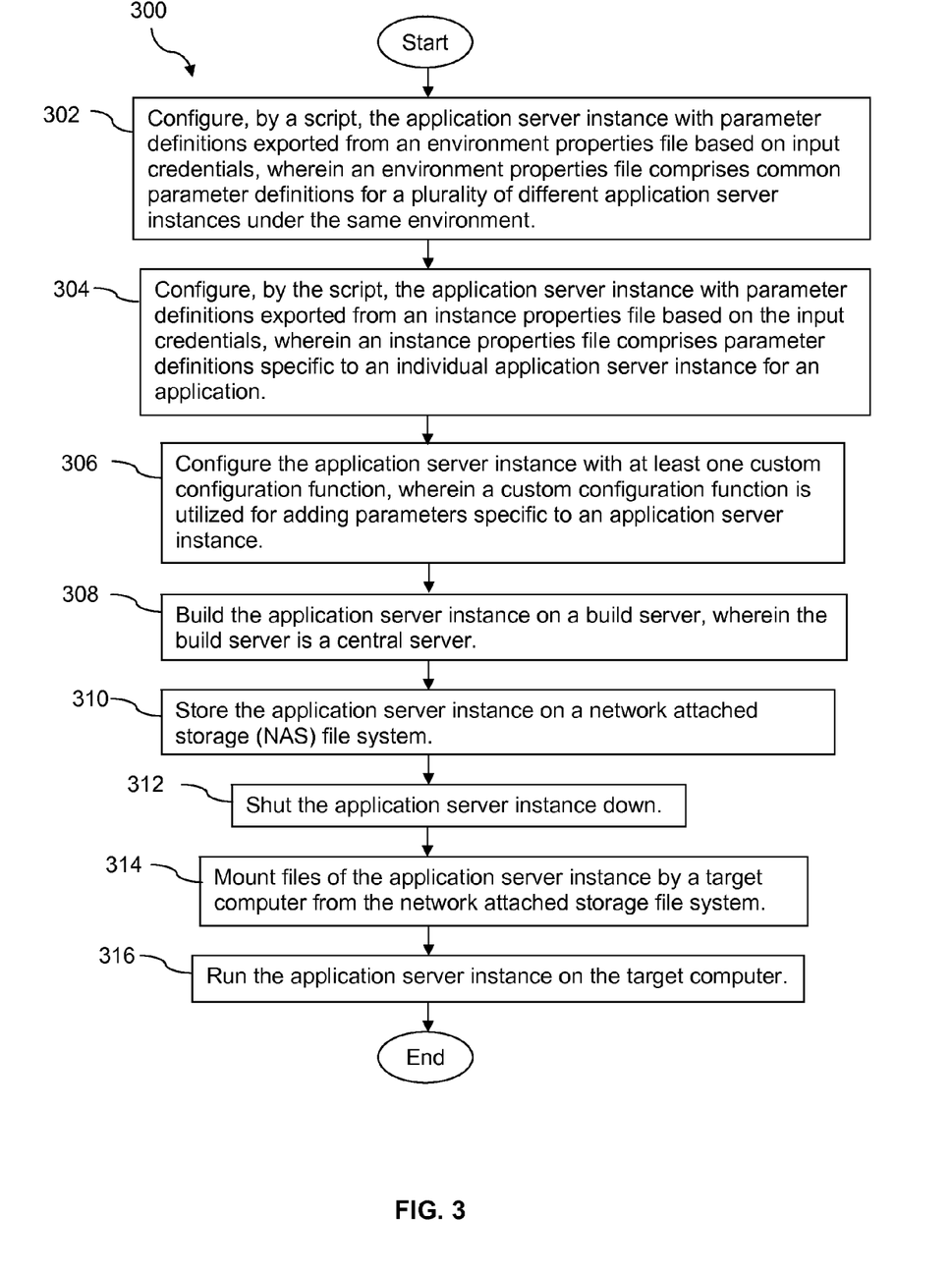
FIG. 3 is a flow chart illustrating another method according to an embodiment of the disclosure.

Turning now to FIG. 3, a method 300 is described. At block 302, the application server instance is configured by a script with parameter definitions exported from an environment properties file based on input credentials, wherein an environment properties file comprises common parameter definitions for a plurality of different application server instances under the same environment. For example, the script 112 may request credential(s) from a user, for example an administrator of the build server 118. The script 112 may locate a corresponding environment properties file 110 in the memory 114 based on the input credential(s). The application server instance 120 that the script 112 is building may be configured by the script 112 with parameter definitions exported from the corresponding environment properties file 110. The environment properties file 110 may comprise common parameter definitions for a plurality of different application server instances 120 under the same environment.

At block 304, the application server instance is configured by the script with parameter definitions exported from an instance properties file based on the input credentials, wherein an instance properties file comprises parameter definitions specific to an individual application server instance for an application. For example, based on the input credential(s), a corresponding instance properties file 108 may also be located from the memory 114 by the script 112.

The application server instance 120 may be configured by the script 112 with parameter definitions exported from the instance properties file 108. The instance properties file 108 may comprise parameter definitions specific to an application while common to application components of that same application.

At block 306, the application server instance is configured with at least one custom configuration function, wherein a custom configuration function is utilized for adding parameters specific to an application server instance. For example, the application server instance 120 may be configured with at least one custom configuration function 122/124. A custom configuration function 122/124 may be utilized for adding parameters specific to an application server instance 120.

A custom configuration function 122/124 may be either an environment custom configuration function 124 or an instance custom configuration function 122. An environment custom configuration function definition 124 may be defined in the end of the environment properties file 110, and parameter definitions may be added to the environment custom configuration function definition 124 to make it an environment custom configuration function 124 before the build process of the application server instance 120 takes place, for example by the administrator of the build server 118. An instance custom configuration function definition 122 may be defined in the end of the instance properties file 108, and parameter definitions may be added to the instance custom configuration function definition 122 to make it an instance custom configuration function 122 before the build process of the application server instance 120 takes place, for example by the administrator of the build server 118.

Parameters in the environment properties file 110 may be standard parameters that are common to a plurality of application server instances 120 under the same environment, the corresponding environment of the environment properties file 110. Rarer environment parameters that are specific to one environment may be added to the environment custom configuration function definition 124. Parameters in the instance properties file 108 may be standard parameters that are common to application server instance(s) 120 for an application, for example application server instance(s) 120 where application components of that same application run. Rarer environment parameters that are specific to one application server instance 120 may be added to the instance custom configuration function definition 122. A custom configuration function definition 122/124 with parameter definitions may be called a custom configuration function 122/124 herein.

The parameter definitions in the environment custom configuration function 124 may be exported and/or configured by the script 112 as part of the exportation and/or configuration of the parameter definitions in the environment properties file 110. The parameter definitions in the instance custom configuration function 122 may be exported and/or configured by the script 112 as part of the exportation and/or configuration of the parameter definitions in the instance properties file 108.

At block 308, the application server instance is built on a build server, wherein the build server is a central server. For example, the application server instance 120 may be built on a build server 118. The build server 118 may be a central server. A central server may hold a repository for various versions of the application server instances 120 and/or various middleware.

At block 310, the application server instance is stored on a network attached storage (NAS) file system. For example, the built application server instance 120 may be stored on the NAS 104 file system. At block 312, the application server instance is shut down. For example, the application server instance 120 may be shut down after the application server instance 120 is stored on the NAS 104 file system.

At block 314, files of the application server instance are mounted by a target computer from the NAS file system. For example, relevant files of the application server instance 120 may be mounted by a target computer 102 from the NAS 104 file system. At block 316, the application server instance is run on the target computer. For example, the application server instance 120 may be run on the target computer 102.

Figure 4:
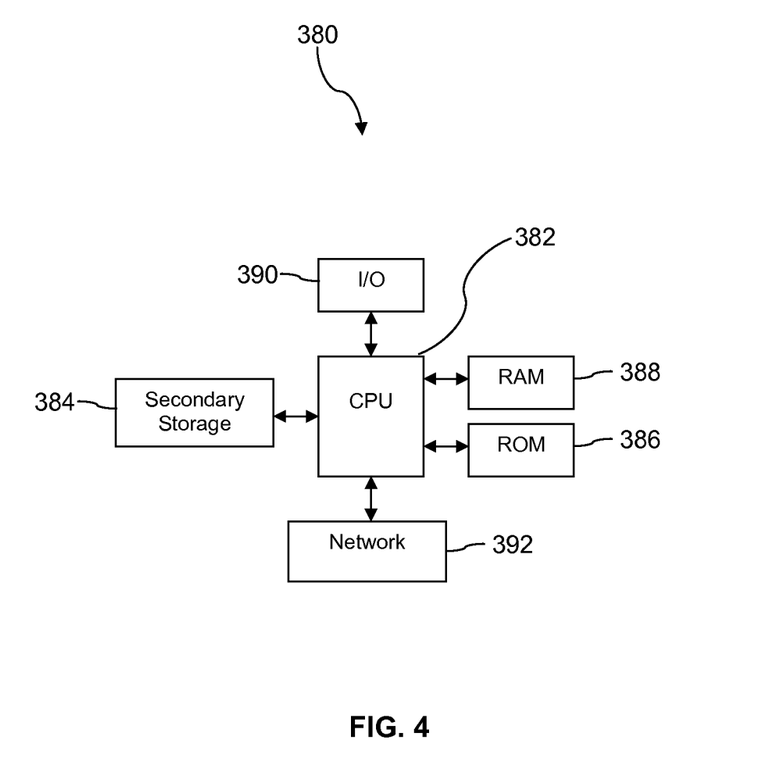
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of building application server instances, comprising:
configuring, by a script, a first application server instance with parameter definitions exported from an environment properties file, wherein an environment properties file comprises common parameter definitions for a plurality of different application server instances under the same environment;
configuring, by the script, the first application server instance with parameter definitions exported from a first instance properties file, wherein an instance properties file comprises parameter definitions specific to an individual application;
building the first application server instance on a build server, wherein the build server is a central server;
storing the first application server instance on a network attached storage (NAS) file system;
mounting files of the first application server instance by a first target computer from the NAS file system;
running the first application server instance on the first target computer;
configuring, by the script, a second application server instance with parameter definitions exported from the environment properties file;
configuring, by the script, the second application server instance with parameter definitions exported from a second instance properties file;
building the second application server instance on the build server;
storing the second application server instance on the NAS file system;
mounting files of the second application server instance by a second target computer from the NAS file system; and
running the second application server instance on the second target computer.

2. The method of claim 1, wherein the environment properties file further comprises a custom configuration function definition to add parameters specific to an environment.

3. The method of claim 1, wherein an instance properties file further comprises a custom configuration function definition to add parameters specific to an application server instance.

4. The method of claim 1, further comprising a final configuration function to perform custom configurations after an application server instance is built and configured.

5. The method of claim 1, wherein one administrative script is composed to conduct administrative functions for each application server instance.

6. The method of claim 1, wherein command-line interface commands (CLICs) are utilized in a build process to execute configuration commands.

7. The method of claim 1, wherein an Java application runs in an application server and wherein the version of a Java development kit (JDK) is defined in the environment properties file.

8. The method of claim 7, wherein the application server is a JBoss application server.

9. A computer server, comprising:
a memory;
a processor;
a plurality of environment properties files stored in the memory, each environment properties file comprising common parameter definitions for a plurality of different application server instances under the same environment;
a plurality of instance properties files stored in the memory, wherein each instance properties file comprises parameter definitions specific to an individual application; and
a script stored in the memory of the computer server, when executed by the processor of the computer server
exports parameter definitions from one of the environment properties files based on input credentials,
exports parameter definitions from one of the instance properties files based on the input credentials,
configures an application server instance with the exported parameter definitions,
builds the application server instance, and
configures the application server instance with at least one custom configuration function, wherein a custom configuration function definition is utilized for adding parameters definitions specific to an application server instance.

10. The computer server of claim 9, wherein the application server is an execution environment for Java code and the application server is a JBoss application server.

11. The computer server of claim 9, wherein the environment properties file comprises at least one of application identification, an application environment, directory of the build server, JBoss version, Java development kit (JDK) version, JBoss vault usage information, logging level information, standard heap size, standard Java options, secure socket layer (SSL) usage information, clustering information, or active directory as login mechanism usage information.

12. The computer server of claim 9, wherein the instance properties file comprises at least one of identification of the target computer, an internet protocol address the application server will listen on, identification of the application server, wait time for an administrative script at starting the application server, wait time for an administrative script at stopping the application server, data sources with their connection information, or size of connection pool.

13. The computer server of claim 9, wherein types of environments comprise development environments, system test environments, test environments, a break fix environment, a training environment, or a production environment.

14. The computer server of claim 9, wherein after the application server instance is built, the application server instance is shut down, files of the application server instance are then mounted by a target computer from a network attached storage (NAS) file system, and the application server instance is run at the target computer.

15. The computer server of claim 9, wherein a second application server instance is built by exporting parameter definitions from a different environment properties file based on input credentials, exporting parameter definitions from a different instance properties file based on the input credentials, configuring the second application server instance with the exported parameter definitions, building the second application server instance, and configuring the second application server instance with at least one custom configuration function by the script.

16. A method of building an application server instance, comprising:
   configuring, by a script, the application server instance with parameter definitions exported from an environment properties file based on input credentials, wherein an environment properties file comprises common parameter definitions for a plurality of different application server instances under the same environment;
   configuring, by the script, the application server instance with parameter definitions exported from an instance properties file based on the input credentials, wherein an instance properties file comprises parameter definitions specific to an individual application server instance for an application;
   configuring the application server instance with at least one custom configuration function, wherein a custom configuration function is utilized for adding parameters specific to an application server instance;
   building the application server instance on a build server, wherein the build server is a central server;
   storing the application server instance on a network attached storage (NAS) file system;
   shutting the application server instance down;
   mounting files of the application server instance by a target computer from the NAS file system; and
   running the application server instance on the target computer.

17. The method of claim 16, wherein one application has at least one application component and each application component runs in one application server instance, wherein command-line interface commands execute configuration commands in the build process.

18. The method of claim 16, wherein Java code runs in the application server and the central server holds a repository comprising middleware or various versions of JBoss, wherein JBoss is a type of Java application server.

19. The method of claim 16, wherein the instance properties file redefines parameters in the environment properties file.

20. The method of claim 16, wherein further comprising, configuring a second application server instance with parameter definitions exported from the environment properties file based on input credentials, configuring the second application server instance with parameter definitions exported from a different instance properties file based on the input credentials, configuring the second application server instance with at least one custom configuration function, building the second application server instance on the build server, storing the second application server instance on the NAS file system, shutting the second application server instance down by the script, mounting files of the second application server instance by a second target computer from the NAS file system, and running the second application server instance on the second target computer.

* * * * *